US007450010B1

(12) United States Patent
Gravelle et al.

(10) Patent No.: US 7,450,010 B1
(45) Date of Patent: Nov. 11, 2008

(54) RFID MUTUAL AUTHENTICATION VERIFICATION SESSION

(75) Inventors: Kelly Gravelle, San Diego, CA (US); Dale L. Scott, Albuquerque, NM (US); Zhenping Tan, Albuquerque, NM (US)

(73) Assignee: TC License Ltd., Hummelstown, PA (US)

( * ) Notice: Subject to any disclaimer, the term of this patent is extended or adjusted under 35 U.S.C. 154(b) by 243 days.

(21) Appl. No.: 11/405,011

(22) Filed: Apr. 17, 2006

(51) Int. Cl.
*G08B 13/14* (2006.01)
(52) U.S. Cl. .............. 340/572.1; 340/5.8; 340/10.1
(58) Field of Classification Search ........ 340/505, 340/572.1, 572.4, 5.2, 5.26, 5.21, 5.8, 5.85, 340/10.1, 10.3, 728, 5.61; 702/182; 455/67.7; 380/270; 235/436
See application file for complete search history.

(56) References Cited

U.S. PATENT DOCUMENTS

| 6,842,106 | B2* | 1/2005 | Hughes et al. ........ 340/5.8 |
|---|---|---|---|
| 7,239,226 | B2* | 7/2007 | Berardi et al. ........ 340/5.61 |
| 7,239,242 | B2* | 7/2007 | Ghosh .............. 340/572.1 |
| 7,255,264 | B2* | 8/2007 | De Leon ............. 235/375 |
| 7,312,707 | B1* | 12/2007 | Bishop et al. ........ 340/572.1 |
| 2003/0018893 | A1* | 1/2003 | Hess et al. ............ 713/169 |
| 2004/0066278 | A1 | 4/2004 | Hughes et al. |
| 2004/0132437 | A1* | 7/2004 | Ohmori et al. ........ 455/414.1 |
| 2005/0093679 | A1 | 5/2005 | Zai et al. |
| 2005/0156022 | A1* | 7/2005 | Hepworth et al. ........ 235/375 |
| 2005/0242176 | A1* | 11/2005 | Roberge et al. ......... 235/383 |
| 2005/0258956 | A1 | 11/2005 | Neuwirth |
| 2006/0006885 | A1* | 1/2006 | Helmut et al. ........ 324/750 |
| 2006/0022799 | A1 | 2/2006 | Juels |
| 2006/0028343 | A1* | 2/2006 | Taylor et al. ......... 340/572.1 |
| 2006/0050877 | A1* | 3/2006 | Nakamura ............ 380/46 |

OTHER PUBLICATIONS

EM-Microelectronic- Marin SA, 125kHz Crypto Read/Write Contactless Identification Device, EM 4170 printed 2002, pp. 1-13.
"Linear Feedback Shift Registers", http://www-math.cudenver.edu/~wcherowi/courses/m5410/m5410frs.html, printed Mar. 30, 2006, pp. 1-8.
David Molnar et al. "Privacy and Security in Library RFID Issues, Practices, and Architectures" CCS 2004, Oct. 25-29, 2004; © 10 pages.
Istvan Vajda et al., htt://www.crysys.hu/, Lightweight Authentication Protocols for Low-Cost RFID Tags, Aug. 5, 2003, pp. 1-10.
Juels, A. and Pappu, R. "Squealing Euros: Privacy Protection in RFID-Enabled Banknotes." 2002.

* cited by examiner

*Primary Examiner*—Brent Swarthout
(74) *Attorney, Agent, or Firm*—Caesar, Rivise, Bernstein, Cohen & Pokotilow, Ltd.

(57) ABSTRACT

In a protocol for preserving the privacy of communications between a RFID reader and a RFID tag, two distinct actions are taken. First, the reader and the tag must be mutually authenticated as being authorized participants in the communications. After that process is successfully completed, the authenticity of each authorized participant must be validated prior to each subsequent communication between reader and tag.

5 Claims, 2 Drawing Sheets

RFID MUTUAL AUTHENTICATION VERIFICATION SESSION

FIELD OF THE INVENTION

The present invention relates generally to radio frequency identification (RFID) systems, and, more particularly, to methods of and devices for protecting the security of communications between RFID tags and readers.

BACKGROUND OF THE INVENTION

In the most basic terms, RFID systems consist of a RFID tag implemented to provide information stored in the tag pertaining to the identity and perhaps features or characteristics of an object to which the tag is affixed, and to communicate that information via an RF signal to a RFID reader in response to an RF interrogation signal received by the tag from the reader. In most instances of current use, a single reader is used to commence individual communication sessions or transactions with a multiplicity of tags.

Typically, objects bearing the tags are moved past the fixed location of the reader, which is remote from the tags but within the communication range, or response range, of each tag as the tag traverses the reader's position. An example of such an application of a RFID system is a roadway toll collection system in which authorized vehicles—that is, vehicles bearing a RFID tag that designates permitted use under the authority of a government agency—are queried or commanded by a RFID reader positioned in a designated lane of the toll collection area to identify themselves as they move "on the fly" past the reader. The remote collection of identities of the vehicles enables the government authority to charge or debit the account of each individual vehicle's owner as registered in conjunction with a computer-aided mailing or other notification system. Such systems represents not only a vast improvement in traffic control, but in efficiency of toll collection and reduction in labor intensive operations as well. This is to be contrasted with the physical collection of the toll at manned (a toll taker person) or unmanned (e.g., coin collection trough) booths in open lanes where each vehicle must stop or at least slow to roll through the lane.

Another example of a RFID system application where the reader is fixed and the object bearing the tag is moved past the reader, is one in which security is to be maintained either to allow passage of the object (e.g., a person wearing a badge that incorporates the tag) into a secure part of a facility, or to announce or prevent passage of the object (e.g., goods to which the tag is secured) from an exit location of a facility as by sounding an alarm or locking the exit.

But depending on the particular application of the RFID system, the reader may be movable so as to acquire stored information from relatively immobile objects, such as in supply chain applications where common goods are temporarily held in cases or on pallets bearing the RFID tag in an inventory setting. The inventoried cases or pallets may be scanned occasionally or periodically by a hand-held RFID reader to acquire the goods' identity information from the tag(s). In still other applications both the tags and the reader may be mobile during the scanning process, such as during rapid scanning of RFID-tagged objects on a moving conveyor belt by a RFID reader being transported in a direction opposite that of the moving belt. In any event, in every application of a RFID system, the reader and the tag must be relatively positioned within a range suitable for RF communication to take place between them; that is, communication range of reader and tag, or response range of the tag.

In its simplest form, the conventional RFID tag consists of a transponder and an antenna. Sometimes, the RFID tag itself is referred to as a transponder. In any event, the tag is provided with data storage capacity, usually in the form of read-only memory (ROM) or read/write (R/W) memory (such as electrically erasable programmable ROM, or EEPROM) embodied in the integrated circuit (IC) of a semiconductor chip (sometimes called a microchip). The electronics circuitry integrated in the microchip of the RFID tag, together with or without the impedance matching circuitry that couples the electronics and the tag's antenna, may be termed a RFIC (RF integrated circuit) or an ASIC (application-specific IC).

RFID tags may be either passive or active. A passive RFID tag lacks an internal self-sufficient power supply, e.g., a battery, and relies instead on the incoming RF query by the reader to produce sufficient power in the tag's internal circuitry to enable the tag to transmit a response. In essence, the query induces a tiny electrical current in the tag's internal antenna, which serves as the power source that enables a reflected or backscattered response. Accordingly, a passive RFID tag is quite limited with respect to the amount of data that can be furnished in its response to a reader's query, usually consisting of only fixed, invariable information stored in the tag, e.g., an ID number and perhaps a small amount of additional data. But the absence of a battery leads to certain advantages, primarily that a passive tag can be fabricated at much lower cost and in smaller size than an active tag.

Among other uses, passive RFID tags are projected to eventually replace the ubiquitous universal product code (UPC), or imprinted bar code, strip found on myriad products in the stream of commerce, the strip requiring a line of sight optical scan to obtain a readout of the identifying UPC. The readout may then be used, for example, to retrieve computerized price information for the product, and to produce a display and/or printout of the product's current price, at a point of sale (e.g., cash register location) for the product.

The on-board, or on-chip, battery of an active RFID tag can give the tag a greater response range, along with greater accuracy, reliability and data storage capacity, but the active tag has the aforementioned disadvantages of greater cost and size relative to the passive tag. The battery itself can be quite small, but not enough to overcome the size disadvantage.

A typical conventional RFID tag reader employs a transceiver, a control unit and an antenna for communicating with the tag at a designated RF frequency among several allocated for this purpose. An additional interface such as RS 232, RS 485, or other, may be provided with the reader to allow data received from the tag to be forwarded to another system.

In many applications it may be important to assure the privacy of information transferred between tag and reader, particularly information stored in the tag. Consider, for example, a vehicle that bears one or more RFID tags whose R/W memory is continuously or periodically updated with mileage driven, current location, daily operating routine, current cargo, owner's identity, authorized driver(s), and other information that the vehicle owner may want to be held confidential. There are concerns, however, over potential loss of privacy and theft of personal identity information as a result of the growing use of RFID tags.

Attempts have been made to protect and to allay concerns regarding the privacy and security of data stored in tags. In general, these attempts have been directed toward protocols and schemes to prevent access to secret, confidential, private information stored in RFID tags through interrogation or interception by unauthorized readers, sometimes called rogue readers, illegitimate readers, intruders, attackers, interceptors or adversaries. These and similar appellations are collectively referred to herein as "unauthorized reader."

One proposed solution is found in an article by I. Vajda et al., titled "Lightweight Authentication Protocols for Low-Cost RFID Tags," Budapest University of Technology and Economics, Hungary, Aug. 5, 2003. In the Vajda article, the desire to provide security in low-cost RFID tags is viewed as challenging because of the highly resource-constrained nature of the tags, and their inability to support strong cryptography. A purported need for special lightweight algorithms that take into account the limitations of RFID tags and the headlong rush toward universal deployment of RFID systems is addressed through a listing of certain tag authentication protocols previously presented by others.

However, Vajda presents the complexity of requiring two states or modes of operation of the tags, and the distinct possibility that an unauthorized reader could penetrate a tag's defense against acquisition of its secure data by gaining entry through the more open ID mode notwithstanding its designation as the locked state. In addition, Vajda's use of a list of pseudonyms has problems in the relatively large number of messages required, as well as the cost factor associated with frequent updating of those pseudonym lists and secret keys, and over-reliance on the premise that an unauthorized reader can only observe a limited number of consecutive runs of the protocol.

Another attempt to protect data stored on tags is discussed in an article by D. Molnar et al., titled "Privacy and Security in Library RFID Issues, Practices and Architecture," CCS'04, Oct. 25-29, 2004, Washington, D.C. Molnar addresses reader and tag authentication before communication of tag information is allowed, specifically in the context of tracking tags in a RFID tagging regime applied to the checking out and in of library books. Such tracking of tagged library books raises the specter of surveillance of library patrons and their reading habits.

As a practical matter, RFID products operating at designated frequencies up to ultra high frequency (UHF) have had relatively minimal need for session verification since most commerce-based transactions have been performed with passive devices. But where a RFID tag is active, and powered by a battery as well, it is relatively easy to remove the battery powered RFID tag from the vicinity of a reader. Therefore, it becomes incumbent from the standpoint of security to afford protection against the tag being removed by an attacker from communication range with an authorized RFID reader during an authenticated session, and then positioning it within range of an unauthorized reader (or positioning the unauthorized reader in the response range of the tag). Such action would enable wide open access to the tag's protected memory locations by the unauthorized reader.

Concern over violations of security and privacy of communications between authorized reader and tag may also be present with a passive tag, but the ability to set up equipment that maintains power at the tag via RF energy at all times is much more difficult, albeit possible.

It would be desirable to provide a simple and yet efficient protocol or method to assure the privacy and security of a communication session between an authorized RFID reader and a RFID tag, especially an active tag.

SUMMARY OF THE INVENTION

It is a principal object of the present invention to provide a relatively simple method or protocol for achieving mutual authentication of a RFID tag and an authorized RFID reader in advance of and throughout a communication session between them.

According to the invention, a communication session to be protected as secure or private is permitted to take place only after the reader and tag have authenticated each other according to a protocol of the invention. Once mutual authentication has been performed successfully, the tag and reader continue to verify subsequent communications to confirm that both devices are authentic. In a preferred protocol, this is achieved by ciphering cyclic redundancy codes (CRC's) that are sent from the reader to the tag and vice-versa.

It is well known that the CRC is an error detection technique intended to assure that received message data has not been corrupted in the course of the message transmission. To that end, a value (a checksum, typically constituting a CRC algorithm) is constructed at the transmitter from a function of the message, and is appended to the message. The receiver uses that same function to calculate the checksum of the received message and compare it with the checksum appended to the message by the transmitter to confirm (or question) whether the message was correctly received.

In the preferred protocol of the invention, the authorized RFID reader sends a command with an encrypted CRC and the RFID tag decrypts the CRC to make certain the encrypted CRC is correct. Similarly, the tag sends a response to the reader's command with an encrypted CRC and the reader decrypts the CRC to make sure this encrypted CRC is also correct. If both are correct, a communication session or transaction is commenced, but continuous verification of mutual authentication is required in order that the transaction be allowed to continue. If each encryption/decryption is not found to be correct; the reader and tag must abort the transaction, and the mutual authentication is required to be repeated from the start. The use of the CRC field, which is in the data stream typically appended to every command and response, allows the state machine to perform as designed. There is no need for special states during the authentication session or any additional time to achieve this.

The principles of the present invention are applicable to both passive and active RFID tags, although the issue of authenticity is somewhat greater with active tags because of the aforementioned relatively easy removal of an active tag from a communications session with an authorized reader.

Another object of the invention is to provide a method of assuring privacy of communications between an active or a passive RFID tag and a remote authorized RFID reader within communication range of the tag, to prevent access to the tag's stored data by an unauthorized reader, in which the method includes performing mutual authentication of the tag and the authorized reader as a prerequisite to a communication transaction between the two; and thereafter continuously verifying the mutual authentication as a prerequisite to each subsequent communication during the transaction.

A related object is to provide a protocol for safeguarding the security of RFID communications between a RFID authorized reader and a RFID tag within an RF response range of the reader, so as to provide read protection for at least a portion of the tag's memory against intrusion by an unauthorized reader, including conducting a process of mutually authenticating the tag and the authorized reader as being authorized to participate in a series of transactions involving a readout of data from the read-protected portion of the tag's memory; and separately verifying the authenticity of the reader as having that authority before each transaction in the series.

BRIEF DESCRIPTION OF THE DRAWING

The above and still further objects, aims, features, aspects and attendant advantages of the invention will become clear to those skilled in the art from a consideration of the following detailed description of the best mode presently contemplated for carrying out the principles of the invention, taken in conjunction with the following figures.

DETAILED DESCRIPTION OF THE PREFERRED EMBODIMENT OF THE INVENTION

In describing a preferred method or protocol of the invention illustrated in the figures, certain specific terminology will be used for the sake of clarity. However, the invention is not intended to be limited to that specific terminology, and it is to be understood that the terminology includes all technical equivalents that perform in a similar manner to accomplish the same or similar result.

Figure 1:
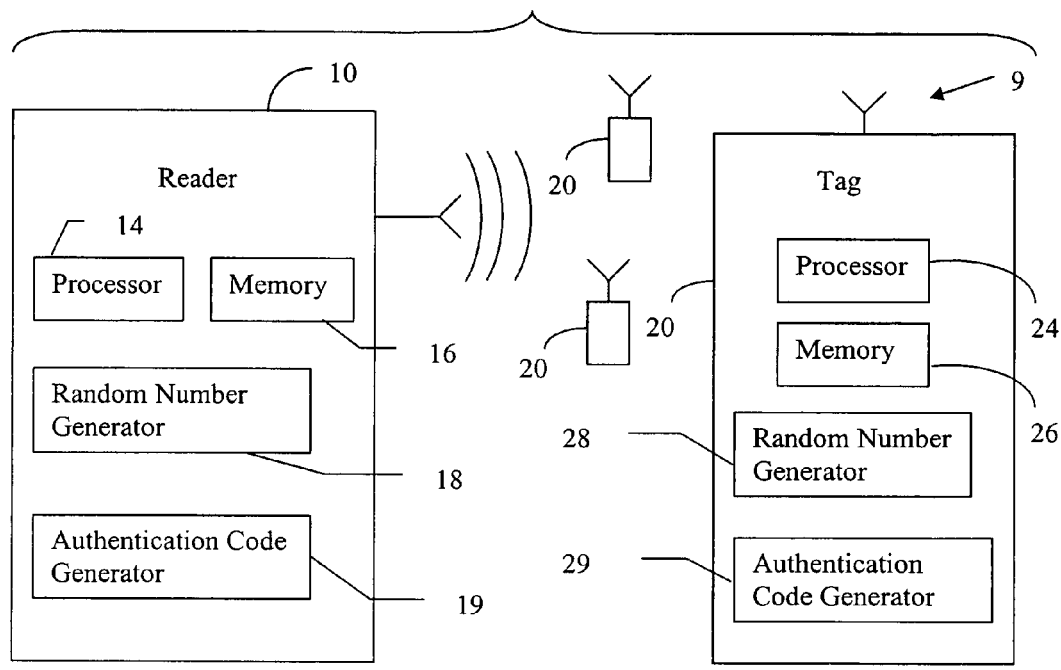
FIG. 1 is a block diagram of a tag and reader in accordance with the preferred embodiment of the invention; and, FIG. 2 illustrates the preferred protocol as a sequence of events that must take place before a communication session between an authorized RFID reader and a RFID tag and each verification of mutual authentication of the two can commence.

Referring to the drawings, FIG. 1 shows the overall system 9 having both a reader 10 and one or more tags 20. As shown, the reader 10 has a processor 14 for controlling operation of the reader 10, memory 16 for storing data, a random number generator 18 for generating random numbers, and an authentication code generator 19 for generating authentication codes. The tag 20 contains a processor 24 for controlling operation of the tag 20, memory 26 for storing data, a random number generator 28 for generating random numbers, and an authentication code generator 29 for generating authentication codes. The tag 10 and reader 20 include other elements that are not shown, including a transmitter and receiver for communicating with one another.

Without limitation to the invention or claims, an authenticated session is deemed to generally be a session that begins once the tag and reader have been authenticated, i.e., each has validated the credentials of the other. As such, subsequent commands and responses and/or their CRC's then become encrypted and decrypted. The encryption and decryption must match for each communication or the session will be terminated by the reader or tag.

It should be noted that mutual authentication is especially important for application in which a user has defined a certain area of memory as being sufficiently important to require protection. If protection is important, then a control bit is set and this forces an authenticated condition to be true before transactions can take place. An implementation may use this control bit to protect against unauthorized readers writing to pages in the tag's memory 26, but not to control a reader's ability to read these areas of memory. However, a similar implementation could be made for read protection.

Figure 2:
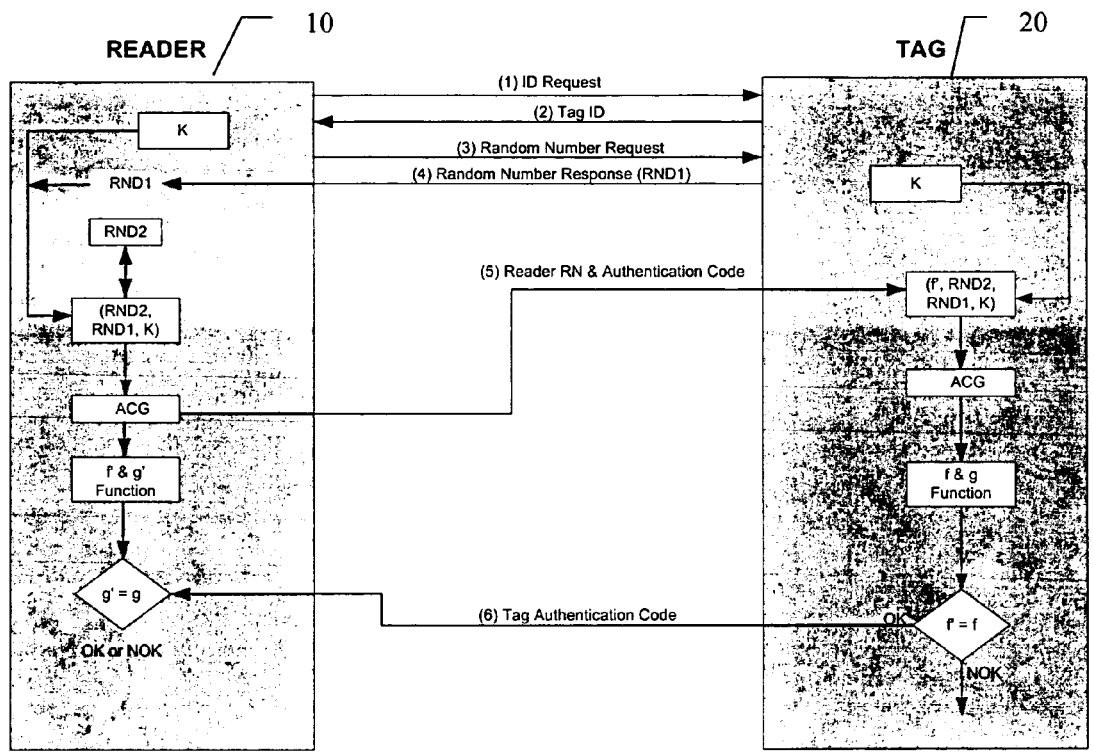

FIG. 2 illustrates the sequence of events that must take place before a communication session and each verification of mutual authentication can commence. The reader 10 and tag 20 operate under control of the processors 14, 24. Though the processors 14, 24 are shown as separate components, the random number generators 18, 28 and authentication code generators 19, 29 can be operations within the processors 14, 24.

As shown, the authorized RFID reader 10 must first request, step 1, and obtain, step 2, the ID of the RFID tag 20 with which the communication session is to be held. The tag's ID is stored in the tag's memory 26. Once the tag's ID is known, the reader obtains the Private Key K. Using the tag ID, the reader 10 obtains the Private Key K from its memory 16, or alternatively from an external database over a secure link. The Private Key K is preferably not obtained from the tag 20 since that is not a secure link. Having obtained the Private Key, the reader 10 issues a command to the tag 20 to request a Random Number RND1, step 3, from the tag 20. The tag 20 generates a random number RND1, using its random number generator 28, and sends that random number RND1 to the reader 10, step 4.

Upon receiving the Random Number RND1, the reader 10 uses its random number generator 18 to create a second Random Number, RND2. The reader 10 then uses both Random Numbers RND1, RND2 and the Private Key K to generate the reader's Authentication Code f'. The reader's Authentication Code f' is determined by the reader's authentication code generator 19 based on a first algorithm or function, which is based on those three variables. The reader 10 sends the Random Number RND2 and its reader Authentication Code f' to the tag 20 step 5.

The tag 20 retrieves its Private Key K, which is stored in a protected area of its memory 26, and the Random Number RND1 that it had sent to the reader 10. The tag authentication generator 29 then performs the same first authentication function that the reader's authentication generator 19 performed using the same variables (i.e., the Private Key K and the random numbers RND1, RND2), and verifies whether or not the reader's Authentication Code f' received from the reader 10 is the same as the reader Authentication Code f that was determined at the tag 20. If the two codes do not match, it is determined that the reader's Authentication Code f' is incorrect and mutual authentication fails.

If the reader's Authentication Code f' is correct (i.e., the authentication code f determined by the tag 20 matches the authentication code f' generated by the reader 10), then the reader 10 has proven its authenticity to the tag 20. The tag's authentication code generator 29 then uses a second authentication function to generate a tag Authentication Code g based on the variables K, RND1 and RND2. The tag 20 transmits its Authentication Code g to the reader 10 for validation, step 6. The authentication code generator 19 for the reader 10 then determines whether or not the tag's Authentication Code g is correct by using the same second authentication function that the tag 20 performed with the same variables (i.e., the Private Key K and the random numbers RND1, RND2). If the tag's Authentication Code g is correct (i.e., the tag authentication code determined by the reader 10 matches the tag authentication code generated by the tag 20), then the tag 20 has proven its authenticity to the reader 10, and the mutual authentication process is complete.

Once this process of mutual authentication is complete, the session verification begins. All subsequent commands that are sent to the tag 20 from the reader 10 have an encrypted CRC, different for each command, appended to the respective command. This encrypted CRC changes and is based upon the sequence that occurred during the mutual authentication process. Preferably, the encryption of the CRC is based at least in part on one or more of the variables RND1, RND2 and K. The tag 20 receives each command and the encrypted CRC appended to it and proceeds by decrypting it. If the decryption is correct, the tag 20 validates, i.e. verifies, that the previously authenticated reader 10 is indeed the reader that sent the respective command.

In accordance with the preferred embodiment, the tag and reader authentication code generators 19, 29 each generate the first and second authentication functions utilizing a shift register with linear feedback. Likewise, the encryption of the CRC is also based on a shift register with linear feedback. Any suitable function can be implemented without departing from the spirit and scope of the present invention. However, the preferred function is obtained through the use of a shift register with linear feedback, such as described in "Linear Feedback Shift Registers," which has been published at http://www-math.cudenver.edu/~wcherowi/courses/m5410/m5410fsr.html, the contents of which are incorporated herein by reference.

When the tag 20 sends back its response to each respective command, the CRC accompanying the response is encrypted and the reader 10 proceeds by decrypting it. If the decryption is correct, the reader validates that the previously authenticated tag is the tag that sent the response. This process will continue until the session is terminated by an incorrect CRC, a loss of power, or a special command from the reader to the tag.

It is well known that the CRC is an error detection technique intended to assure that received message data has not been corrupted in the course of the message transmission. To that end, a value (a checksum, typically constituting a CRC algorithm) is constructed at the transmitter from a function of the message, and is appended to the message. The receiver uses that same function to calculate the checksum of the received message and compare it with the checksum appended to the message by the transmitter to confirm (or question) whether the message was correctly received.

In the preferred protocol of the invention, the authorized RFID reader sends a command with an encrypted CRC and the RFID tag decrypts the CRC to make certain the encrypted CRC is correct. Similarly, the tag sends a response to the reader's command with an encrypted CRC and the reader decrypts the CRC to make sure this encrypted CRC is also correct. If both are correct, a communication session or transaction is commenced, but continuous verification of mutual authentication is required in order that the transaction be allowed to continue. If each encryption/decryption is not found to be correct; the reader and tag must abort the transaction, and the mutual authentication is required to be repeated from the start. The use of the CRC field, which is in the data stream typically appended to every command and response, allows the state machine to perform as designed. There is no need for special states during the authentication session or any additional time to achieve this.

This protocol is uncomplicated and extremely efficient. Initially, before a communication session can be entered in which data stored in the tag's memory or a designated portion of memory is read or altered by the reader, the reader and the tag engage in the mutual authentication process. But that alone is not deemed to be sufficient to guard against the possibility that an unauthorized reader will seek to impersonate the authorized (and authenticated) reader and succeed to retrieve data designated as private from the tag. Rather, for each command from the reader to the tag and each response from the tag to the reader, the previous authentication is verified through a process of encryption and decryption of CRC's accompanying each command and response. Failure to verify authentication of the sender at any point in the sequence constitutes cause for aborting the communication session.

The foregoing description and accompanying drawing should be considered as illustrative only of the principles of the invention. The invention may be configured in a variety of ways and is not intended to be limited by the preferred embodiments or methods. Numerous applications of the invention will readily occur to those skilled in the art from a consideration of the foregoing description. Therefore, it is desired that the invention not be limited to the specific example disclosed or the construction and operation shown and described. Rather, all suitable modifications and equivalents may be resorted to, falling within the scope of the invention.

What is claimed is:

1. A communications system comprising:
  a radio frequency identification (RFID) tag comprising
    a tag memory storing a private key and a tag identification (ID),
    a tag random number generator for generating a first random number,
    a tag authentication code generator, and
    a tag processor for causing the tag ID to be transmitted; and,
  a RFID reader comprising
    a reader random number generator for generating a second random number,
    a reader memory storing private keys for tags and tag IDs, each private key associated with one of the tag IDs,
    a reader processor for receiving the tag ID transmitted from the RFID tag and retrieving from said reader memory the tag private key associated with the received tag ID,
    a reader authentication code generator for receiving the first random number, the second random number, and the retrieved tag private key, said reader authentication code generator generating a reader authentication code based on the private key, the first random number, and the second random number,
    wherein said reader processor causes said reader authentication code to be transmitted to said tag;
  wherein said tag authentication code generator further generates a reader authentication code based on the private key, the first random number, and the second random number, and said tag processor determines whether the reader is authentic based on a comparison of the reader authentication code transmitted by the reader and the reader authentication code generated by the tag authentication code generator.

2. The system according to claim 1, wherein said tag accepts communications from said reader if said tag processor determines that the reader is authentic.

3. The system according to claim 1, wherein said tag processor determines that the reader is authentic if the reader authentication code transmitted by the reader matches the reader authentication code generated by the tag authentication code generator.

4. The system according to claim 1, wherein said tag authentication code generator further generates a tag authentication code based on the private key, the first random number, and the second random number, and said tag processor causes said tag authentication code to be transmitted to said reader, and further wherein said reader authentication code generator generates a tag authentication code based on the private key, the first random number, and the second random number, and said reader processor determines whether the tag is authentic based on a comparison of the tag authentication code transmitted by the tag and the tag authentication code generated by the reader.

5. The system according to claim 4, wherein said reader accepts communications from said reader if said tag processor determines that the reader is authentic and said tag accepts communications from said reader if said reader processor determines that the tag is authentic.

* * * * *